United States Patent [19]
Gross

[11] 3,915,752
[45] Oct. 28, 1975

[54] BATTERY CAP WITH FLAME BARRIER VENT FILTER

[75] Inventor: George E. Gross, Arlington Heights, Ill.

[73] Assignee: Illinois Tool Works Inc., Chicago, Ill.

[22] Filed: May 8, 1974

[21] Appl. No.: 468,107

[52] U.S. Cl.................................. 136/170; 136/177
[51] Int. Cl.²........................................ H01M 1/06
[58] Field of Search .......... 136/177, 179, 180, 163, 136/170; 220/331, 373, 367; 137/43

[56] References Cited
UNITED STATES PATENTS

| | | | |
|---|---|---|---|
| 2,298,938 | 10/1942 | Griffin, Jr. et al. | 220/44 |
| 3,033,911 | 5/1962 | Duddy | 136/177 |
| 3,159,508 | 12/1964 | Chreitzberg | 136/166 |

Primary Examiner—Anthony Skapars
Attorney, Agent, or Firm—Robert W. Beart; Glenn W. Bowen

[57] ABSTRACT

A flame barrier vent filter for a battery cap is disclosed. The filter has an external domed shape configuration which is achieved by compression of the ends of the filter so that the outer edge of the filter is made substantially nonporous to escaping battery gas. In this manner, any flame that results from ignition of vented gases will tend to be confined in the center of the filter. The filter is made of a material having a low heat conductivity such as polyvinyl flouride, polyethylene or polypropylene or similar materials which resists melting of the cap if a flame does break out.

4 Claims, 2 Drawing Figures

BATTERY CAP WITH FLAME BARRIER VENT FILTER

BACKGROUND OF THE INVENTION

It is desirable to provide vents in storage battery caps to allow the internal hydrogen and oxygen gases under pressure in the battery to vent to the atmosphere to prevent the fill caps from being forced off the battery. However, in allowing battery gas under pressure to vent, there is a danger that a spark in the vicinity of the battery will ignite the gas and cause the flame to spread inside the battery thereby causing an explosion. Porous materials have been used as filters in the vent openings of the battery caps to act as a flame barrier which confines the flame to the outside of the battery should a spark ignite the gas as long as the cap remains intact.

Silicon carbide has probably been the chief material used for such a purpose. This material, however, is quite hard and tends to fracture very easily. In addition, silicon carbide is very hard to work with because of its hardness which requires special handling techniques that create a number of problems in forming the filters. Silicon carbide also is a good heat conductor; and when a flame has been ignited on the outside of the battery, the heat from the flame tends to spread rapidly to the outer edges of the filter so as to cause the battery cap to melt after several seconds. Once the battery cap melts, a danger of explosion again exists. The prevention of the melting of the cap may provide enough time for the flame to be extinguished; and it is, therefore, an important consideration in the use of such caps.

It is, therefore, an object of the present invention to provide a vent filter for a battery cap which is shaped so that if a flame is ignited on the outside of the battery, the flame will tend to be restricted to the central area of the battery cap.

It is a further object of the present invention to provide a battery cap with a vent filter of a flame retardent, low heat conductivity material which is formed by compression of the edges of the filter so that the outer edge of the filter is made substantially nonporous to escaping battery gas.

Other objects and advantages of the present invention will be apparent from the following description and accompanying drawings.

DESCRIPTION OF THE DRAWINGS

The present invention is illustrated in the following drawings in which.

TECHNICAL DESCRIPTION OF THE INVENTION

Figure 1:
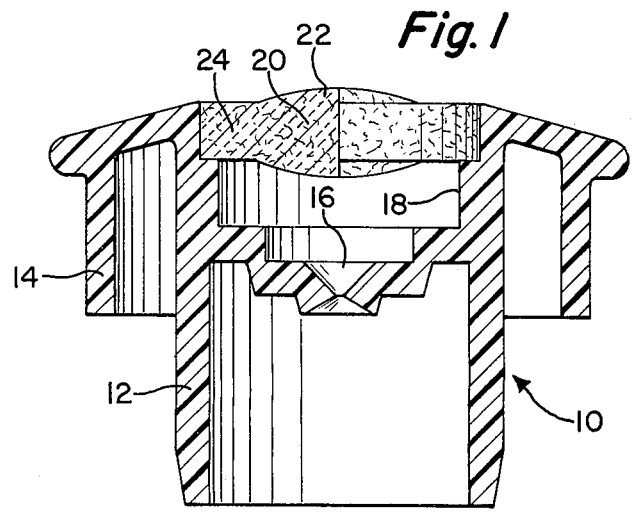
FIG. 1 is a cross-sectional side view of a vent filter in a battery cap.
Figure 2:
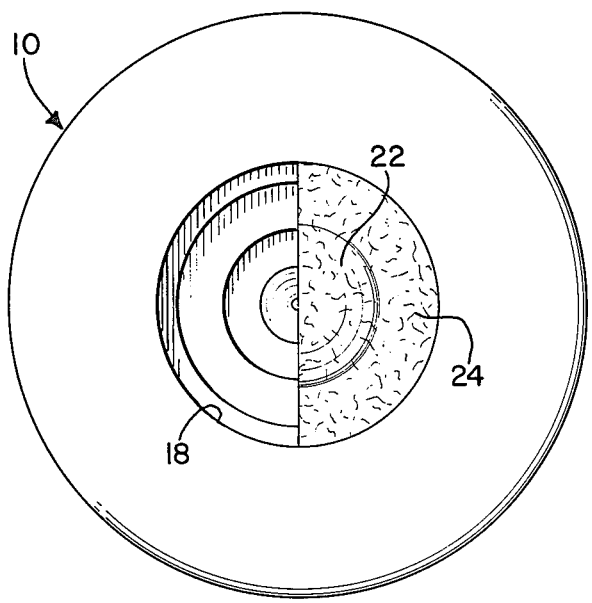
FIG. 2 is a partial cross-sectional top view of the filter and battery cap of FIG. 1.

Referring to the drawings there is shown in FIGS. 1 and 2 a battery cap 10 of a generally typical construction. The cap 10 is formed of a cylindrical inner portion 12 which extends into the battery and a large diameter outer cylindrical portion 14 which serves to close the battery cap opening. The interior of the inner portion 12 leads to a centrally located channel 16 in the wall 26 which is in communication in the interior of the battery. The top of the cap 10 has a cylindrical cavity 18 formed in it for receiving the vent filter 20 which is also in communication with the channel 16.

The filter 20 is formed to have the smaller thickness at its outer edge 24 than at its external dome-shaped center portion 22 by compression of the outer edge portion 24 of the filter 10. The filter 10, before compression, may be of a substantially uniform cross-sectional area. Compression of the filter 20 causes the porosity of the filter at the outer edge to be appreciably reduced so that its outer edge is substantially nonporous as far as escaping gas is concerned, thereby reducing noticeably the possibility of a flame being ignited at the outer edge portion 24. The thickness of the filter 20 at the edge 24, for example, may be approximately one-half the thickness of the dome-shaped center portion 22 after compression. The porosity at the edge 24 may then typically range from approximately one-half to one-sixth, or less, the porosity of the center portion 22 depending on the type of material employed.

The filter 20 is preferably formed of a heat retardent plastic so that it acts as a flame barrier if the gas being vented should be ignited, which normally has a porosity in the range of 200 microns or less. One suitable plastic is polyvinyl fluoride, but other suitable plastic materials, including polyethylene and polypropylene, are suitable if satisfactory conventional flame retardents are added. Polyvinyl fluoride also has a low heat conductivity so that if a flame is ignited, heat conduction to the plastic battery cap 10 will be retarded, and the additional time may be enough to allow for the extinguishment of the flame in a crucial situation. The material used preferably is either non-flammable or self-extinguishing. For a typical battery operation, the porosity of the outer edge portion 24 will be from 0 to 5 microns and the porosity of the center portion 22 will be from 10 to 30 microns. Porosity as used above refers to the average diameter of the pores.

The invention is claimed as follows:

1. A battery cap having a centrally located channel in communication with the interior portion of said battery cap, a filter secured in said channel having a first surface which is in communication with the surrounding atmosphere and a second surface which is in communication with said channel and which is formed of an initially porous material of a substantially uniform cross-sectional area which has an outer edge portion that is compressed sufficiently to render it substantially nonporous while the central area remains porous to escaping battery gases.

2. A battery cap as set forth in claim 1 wherein said filter is made of polyvinyl fluoride.

3. A battery cap as set forth in claim 1 wherein said filter is made of polyethylene.

4. A battery cap as set forth in claim 1 wherein said filter is made of polypropylene.

* * * * *